United States Patent [19]
Uter

[11] Patent Number: 5,613,382
[45] Date of Patent: Mar. 25, 1997

[54] DEVICE FOR SECURING THE ACCELERATOR AND BRAKE PEDALS OF A VEHICLE

[76] Inventor: Donavon S. Uter, 13 Bleeker St., Apt. 9, Mount Vernon, N.Y. 10550

[21] Appl. No.: 630,947

[22] Filed: Apr. 5, 1996

[51] Int. Cl.[6] .................................................. G05G 5/00
[52] U.S. Cl. ........................... 70/199; 70/238; 70/432; 70/DIG. 59
[58] Field of Search ............... 70/198–203, 245–248, 70/432, 434, 435, 441, 237–239, 254, DIG. 59; 180/287

[56] References Cited

U.S. PATENT DOCUMENTS

| 1,421,021 | 6/1922 | Miller | 70/200 |
|---|---|---|---|
| 1,444,935 | 2/1923 | Mokracek | 70/200 |
| 1,475,863 | 11/1923 | Pate | 70/199 |
| 1,527,992 | 3/1925 | Norton | 70/200 |
| 4,030,323 | 6/1977 | Stanislawczyk | 70/202 X |
| 4,959,981 | 10/1990 | Davidson | 70/238 |

FOREIGN PATENT DOCUMENTS

| 6021033 | 3/1926 | France | 70/200 |
|---|---|---|---|
| 249517 | 7/1926 | Italy | 70/199 |
| 239355 | 9/1925 | United Kingdom | 70/200 |

*Primary Examiner*—Lloyd A. Gall

[57] ABSTRACT

A new and improved device for securing the accelerator and brake pedals of a vehicle including a lower plate having a first rectangular notch and a second rectangular notch, a primary aperture and a secondary aperture, a lock indicator having a lower surface and an upper surface with the upper surface of the lock indicator secured to the lower plate, a number of light emitting diodes secured to one of the edges of the lock indicator. The device further includes an upper plate having a first rectangular notch and a secondary rectangular notch, a primary aperture and a secondary aperture. A pin is employed in securing the lower plate to the upper plate by way of the primary aperture. The pin enables the lower and upper plates to be pivotally related to each other. A locking device is secured within the secondary apertures of the lower plate and upper plate. The lock is defined by a key receiving end and a cylinder end. This lock has a first orientation which permits its removal from the two apertures and a second orientation which prohibits its removal and keeps the two plates in a closed orientation.

3 Claims, 4 Drawing Sheets

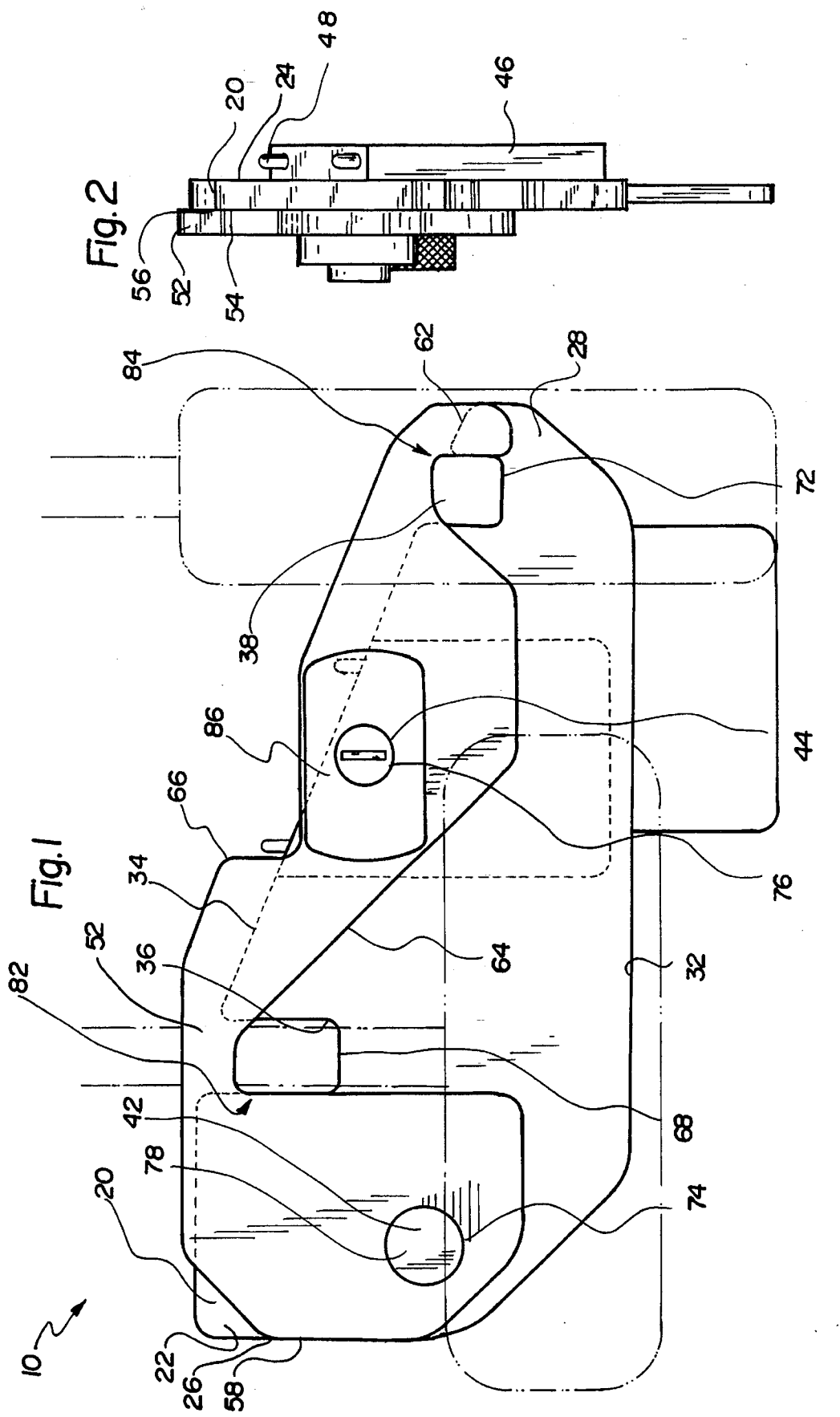

DEVICE FOR SECURING THE ACCELERATOR AND BRAKE PEDALS OF A VEHICLE

BACKGROUND OF THE INVENTION

1. Field of the Invention

The present invention relates to device for securing the accelerator and brake pedals of a vehicle and, more particularly, pertains to a device securing both the accelerator and brake pedals of a vehicle.

2. Description of the Prior Art

The use of vehicle lock is known in the prior art. More specifically, vehicle lock heretofore devised and utilized for the purpose of gas pedal lock are known to consist basically of familiar, expected and obvious structural configurations, notwithstanding the myriad of designs encompassed by the crowded prior art which have been developed for the fulfillment of countless objectives and requirements.

By way of example, the prior art discloses in U.S. Pat. No. 5,359,868 to Villani an automobile anti-theft gas pedal lock.

U.S. Pat. No. 5,181,404 to Baker discloses a motor vehicle brake pedal locking device.

U.S. Pat. No. 5,001,913 to Gamboni discloses an automotive, anti-theft device for brakes.

U.S. Pat. No. 4,432,432 to Martin discloses an automotive anti-theft device.

Lastly, U.S. Pat. No. 3,990,280 to Jahn discloses an anti-theft device for automobiles.

In this respect, the device for securing the accelerator and brake pedals of a vehicle according to the present invention substantially departs from the conventional concepts and designs of the prior art, and in so doing provides an apparatus primarily developed for the purpose of a device securing both the accelerator and brake pedals of a vehicle.

Therefore, it can be appreciated that there exists a continuing need for new and improved device for securing the accelerator and brake pedals of a vehicle which can be used for a device securing both the accelerator and brake pedals of a vehicle. In this regard, the present invention substantially fulfills this need.

SUMMARY OF THE INVENTION

In view of the foregoing disadvantages inherent in the known types of vehicle lock now present in the prior art, the present invention provides an improved device for securing the accelerator and brake pedals of a vehicle. As such, the general purpose of the present invention, which will be described subsequently in greater detail, is to provide a new and improved device for securing the accelerator and brake pedals of a vehicle apparatus and method which has all the advantages of the prior art and none of the disadvantages.

To attain this, the present invention essentially comprises a new and improved securing and indicating device for the accelerator and brake pedals of a vehicle, the securing and indicating device comprising, in combination, a lower plate having an upper surface, a lower surface, a first end, a second end, a front edge and a rear edge. A first rectangular notch is formed in the rear edge approximate the first end. A second rectangular notch is formed within the rear edge approximate the second edge. The rear edge extends at an angle between the first and second notches. A primary aperture is formed within the lower plate approximate the first end. A secondary aperture is formed within the lower plate intermediate the first and second notches approximate the rear edge. A lock indicator has an upper surface, a lower surface, a forward edge and an angled rear edge. A number of light emitting diodes are secured to the rear edge. An aperture is formed within the upper surface of the lock indicator. The upper surface of the lock indicator is secured to the lower surface of the upper plate intermediate the first and second rectangular notches such that the angled rear edge of the lock indicator matches the angle of the rear edge of the lower plate between the first and second rectangular notches. The lock indicator has a first state wherein the light emitting diodes are illuminated and a second state wherein the light emitting diodes are not illuminated. An upper plate has an upper surface, a lower surface, a first end, a second end, a front edge, a rear edge. A first rectangular notch is formed within the front edge proximate the first end. A second rectangular notch is formed within the front edge approximate the second end. A portion of the front edge intermediate the first and second rectangular notches is angled. A primary aperture is formed within the upper plate approximate the first end. A secondary aperture is formed within the upper plate intermediate the first and second rectangular notches. A pin is secured to the primary aperture of the lower plate and the primary aperture of the upper plate such that the lower plate and upper plate can pivot relative to each other with the lower surface of the upper plate sliding upon the upper surface of the lower plate. The lower and upper plates together have a closed orientation wherein the first rectangular aperture of the lower plate cooperates with the first rectangular aperture of the upper plate to define a brake pedal retaining aperture and the second aperture of the lower plate cooperates with the second aperture of the upper plate to define an accelerator pedal retaining aperture. A lock has a receiving end and a cylinder end with the lower and upper plates in the closed orientation. The cylinder end is adapted to be inserted in the secondary aperture of the lower plate and the secondary aperture of the upper plate and the aperture of the lock indicator. A lock has a first orientation permitting the lock to be removed from the apertures of the lower and upper plates and a second orientation securing the lock within the apertures of the lower and upper plates and keeping the lower and upper plates in their closed orientation as well as placing the indicator means in its first state.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved device for securing the accelerator and brake pedals of a vehicle which has all the advantages of the prior art vehicle locks and none of the disadvantages.

It is another object of the present invention to provide a new and improved device for securing the accelerator and brake pedals of a vehicle which may be easily and efficiently manufactured and marketed.

It is a further object of the present invention to provide a new and improved device for securing the accelerator and brake pedals of a vehicle which is of a durable and reliable construction.

An even further object of the present invention is to provide a new and improved device for securing the accelerator and brake pedals of a vehicle which is susceptible of a low cost of manufacture with regard to both materials and labor, and which accordingly is then susceptible of low prices of sale to the consuming public, thereby making such vehicle lock economically available to the buying public.

Still yet another object of the present invention is to provide a new and improved device for securing the accelerator and brake pedals of a vehicle which provides in the apparatuses and methods of the prior art some of the advantages thereof, while simultaneously overcoming some of the disadvantages normally associated therewith.

Still another object of the present invention is to a device securing both the accelerator and brake pedals of a vehicle.

Lastly, it is an object of the present invention to provide a new and improved device for securing the accelerator and brake pedals of a vehicle including a lower plate having a first rectangular notch and a second rectangular notch, a primary aperture and a secondary aperture, a lock indicator having a lower surface and an upper surface with the upper surface of the lock indicator secured to the lower plate, a number of light emitting diodes secured to one of the edges of the lock indicator. The device further includes an upper plate having a first rectangular notch and a secondary rectangular notch, a primary aperture and a secondary aperture. A pin is employed in securing the lower plate to the upper plate by way of the primary aperture. The pin enables the lower and upper plates to be pivotally related to each other. A locking device is secured within the secondary apertures of the lower plate and upper plate. The lock is defined by a key receiving end and a cylinder end. This lock has a first orientation which permits its removal from the two apertures and a second orientation which prohibits its removal and keeps the two plates in a closed orientation.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a plan view of the securing device of the preferred embodiment of the device for securing the accelerator and brake pedals of a vehicle constructed in accordance with the principles of the present invention.

FIG. 2 is a elevational view of the securing device in accordance with the present invention.

Similar reference characters refer to similar parts throughout the several views of the drawings.

DESCRIPTION OF THE PREFERRED EMBODIMENT

Figure 3:
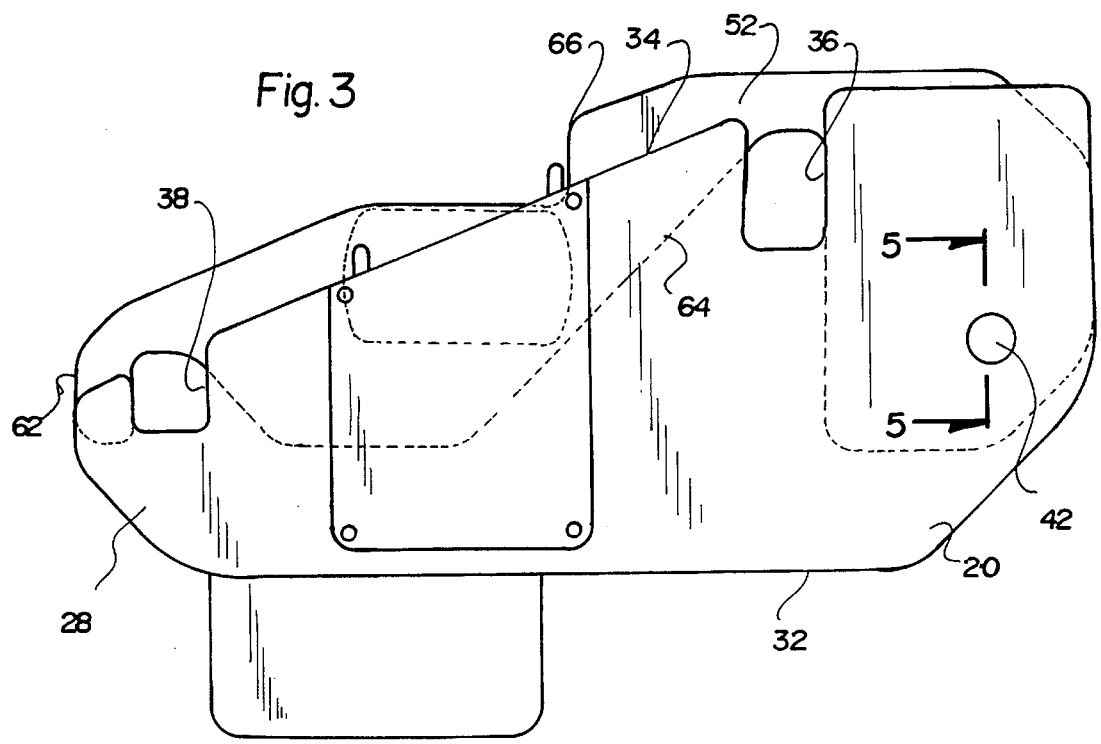
FIG. 3 is a plan view of the securing device in accordance with the present invention.
Figure 4:
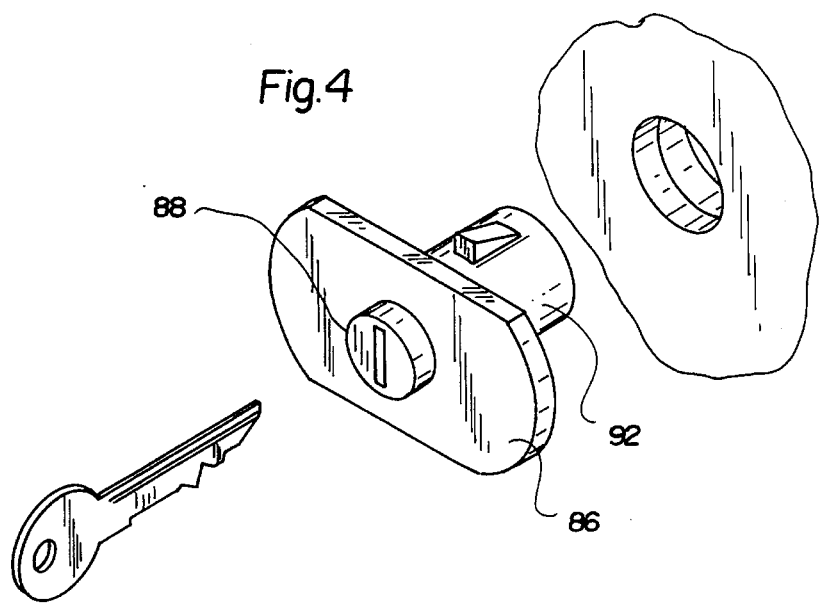
FIG. 4 is an exploded view of the lock employed in the present invention.
Figure 5:
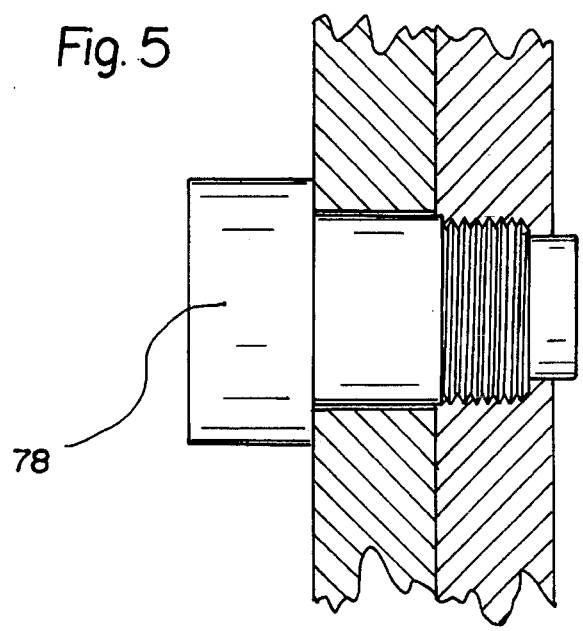
FIG. 5 is a view taken along line 5—5 of FIG. 3.
Figure 6:
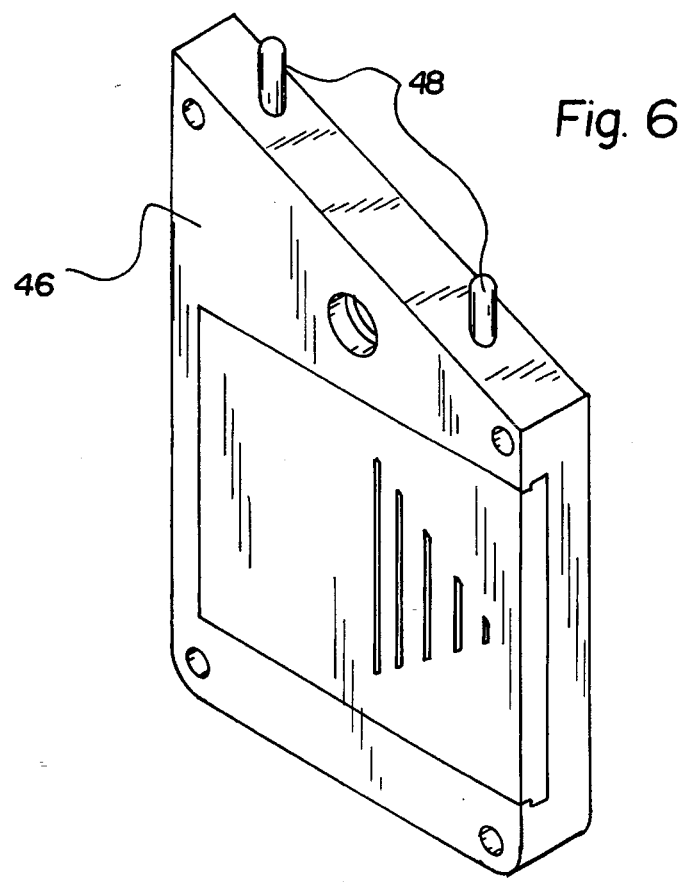
FIG. 6 is a view of the indicator device of the present invention.

With reference now to the drawings, and in particular to FIG. 1 thereof, a new and improved device for securing the accelerator and brake pedals of a vehicle embodying the principles and concepts of the present invention and generally designated by the reference numeral 10 will be described.

The present invention relates to a device for securing the accelerator and brake pedals of a vehicle from unauthorized use. The present invention also relates to an indicator device for indicating when the device is in a state preventing unauthorized use and when it is in a state which permits use. In its broadest context, the present invention includes a lower plate having two pedal receiving notches formed along its length and an upper plate with two corresponding pedal receiving notches formed along its length. These two plates are pivotally related to each other such that the two sets of notches can together form a first brake pedal receiving aperture and a second accelerator pedal receiving aperture. The details as to the various components of the present invention and the manner in which they interrelate will be described in greater detail hereinafter.

The lower plate 20 is defined by an upper surface 22, a lower surface 24, a first end 26, a second end 28, a front edge 32 and a rear edge 34. A first rectangular notch 36 is formed within the rear edge 34 approximate the first end 26. Similarly, a second rectangular notch 38 is formed within the rear edge 34 approximate the second end 28. In the preferred embodiment, the rear edge 34 extends at an angle between the first and second notches. This can clearly be seen in the dotted lines in FIG. 1. The first rectangular notch 36 functions in securing the brake pedal while the second rectangular notch 38 functions in securing the accelerator pedal. Details as to this securement will be provided in greater detail hereinafter. A primary aperture 42 is formed in the lower plate 20 approximate the first end 26. Likewise, a secondary aperture 44 is formed in the lower plate 20 intermediate the first and second notches 36 and 38 respectively. Furthermore, the secondary aperture 44 is positioned approximate the rear edge 34. The primary aperture 42 functions in pivotally securing the lower plate to an upper plate. The secondary aperture 44 functions in keeping the lower and upper plates in a locked orientation. However, the specific function of the primary and secondary apertures will be described in greater detail hereinafter.

The present invention further includes a lock indicator 46 which is defined by an upper surface, a lower surface, a forward edge and an angled rear edge. This lock indicator 46 carries a number of light emitting diodes 48 all of which are secured to the rear edge. Any number of light emitting diodes can be employed. However, in the preferred embodiment, two such light emitting diodes 48 are employed. Furthermore, other lights can be employed such as a liquid crystal display arrangement. The upper surface of the lock indicator 46 is secured to the lower surface 24 of the lower plate 20 intermediate the first and second rectangular notches 36 and 38 respectively. This securement can be achieved in any number of ways. However, in the preferred embodiment, a number of screws are employed in securing the lock indicator 46 to the lower plate 20. The securement is such that the angled rear edge of the lock indicator 46 matches the angle of the rear edge 34 of the lower plate 20 intermediate the first and second rectangular notches 36 and 38 respectively. The lock indicator employs a power source within its interior and a circuit which serves to selectively deliver power to the light emitting diodes. The power source in the preferred embodiment can be provided by conventional batteries. The circuit enables the lock indicator 46 to have a first state wherein the light emitting diodes 48 are illuminated and a second state wherein the light emitting diodes 48 are not illuminated. Furthermore, an aperture is formed in the upper surface of the lock indicator which functions to selectively change the indicator from its first state to its second state.

The upper plate 52 is defined by an upper surface 54, a lower surface 56, a first end 58, a second end 62, a front edge 64 and a rear edge 66. As with the lower plate 20, the upper plate 52 includes a first generally rectangular notch 68 formed within the front edge 64 approximate the first end 58. Likewise, a second generally rectangular notch 72 is formed in the front edge 64 approximate the second end 62. In the preferred embodiment, a portion of the front edge 64 intermediate the first and second rectangular notches 68 and 72 respectively, is inclined at an angle. Furthermore, a primary aperture 74 is formed within the upper plate 52 approximate the first end 58. Similarly, a secondary aperture 76 is formed within the upper plate 52 intermediate the first and second rectangular notches 68 and 72 respectively.

A pin 78 is secured to the primary aperture 42 of the lower plate 20 and the primary aperture 74 of the upper plate 52 such that the lower plate 20 and the upper plate 52 can pivot relative to each other. This pivotal action is afforded by the lower surface 56 of the upper plate 52 sliding upon the upper surface 22 of the lower plate 20. Together, the lower and upper plates 20 and 52 respectively, have a closed orientation wherein the first rectangular aperture 36 of the lower plate cooperates with the first rectangular aperture 68 of the upper plate to define a brake pedal retaining aperture 82. In a similar fashion, the second aperture 38 of the lower plate cooperates with the second aperture 72 of the upper plate to define an accelerator pedal retaining aperture.

A lock 86, which is defined by a key receiving end 88 and a cylinder end 92, can be employed in keeping the lower and upper plates in their closed orientation. With the lower and upper plates in their closed orientation, the cylinder end 92 of the lock 86 is adapted to be inserted within the secondary aperture 44 of the lower plate 20 and within secondary aperture 76 of the upper plate 52 as well as in the aperture of the lock indicator 46. The lock 86 has a first orientation permitting it to be removed from the three apertures namely the secondary apertures of the lower and upper plates as well as the aperture of the lock indicator. However, the lock has a second orientation wherein it is secured within the aforementioned apertures. In this second orientation, the lock 86 not only prohibits its removal but prohibits the relative movement of the lower and upper plates. Furthermore, when the lock 86 is in the second orientation, it engages the aperture formed within the lock indicator in such a manner as to place the lock indicator in its first state, more specifically, with the light emitting diodes illuminated. The lock 86, as well as all the other major components of the present invention, are preferably constructed of a rolled steel in order to prevent the destruction or defeating of the securing device.

Figure 7:
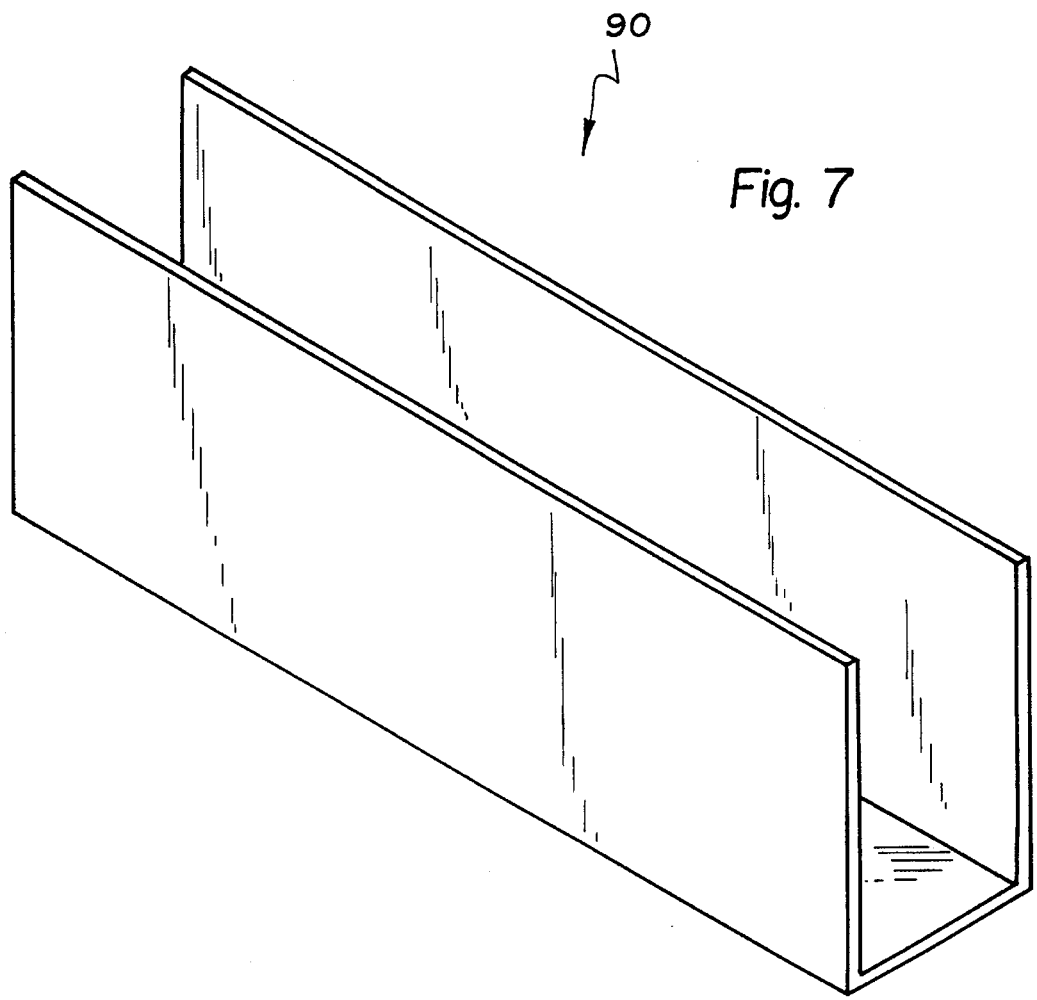
FIG. 7 is a perspective view of the channel plate which can be employed with the present invention.
Figure 8:
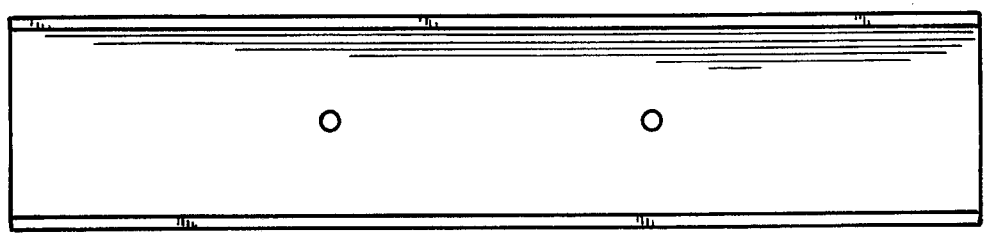
FIG. 8 is a plan view of the channel plate which can be employed with the present invention.

Thus, in operation, a user takes the securing device of the present invention in its open configuration and places it adjacent the brake and accelerator pedals of the vehicle to be protected. The first apertures are positioned adjacent the brake pedal, more specifically, around the lever arm extending from the brake pedal. Likewise, the secondary apertures are secured adjacent the accelerator pedal, more specifically, around the lever arm extending away from the accelerator pedal. The device is then pivoted to its closed orientation thereby prohibiting movement of either the accelerator or brake pedal. In an alternative embodiment, a channel 90 can be employed in supporting the securing device. The channel 90 is most clearly seen in reference to FIGS. 7 and 8. In use, the operator secures the channel 90 inbetween the accelerator and brake pedals upon the floor of the vehicle. The securement can be achieved by way of the bolt holes formed within the channel 90. With this orientation, the channel 90 can be employed in supporting portions of the securing device as it is secured about the vehicle pedals. Next, the device is placed in a locked orientation. This is achieved by inserting the lock into the secondary apertures of both the lower and upper plates and into the aperture of the lock indicator. The lock in then turned by way of a key to its second orientation. In the second orientation, the lock is prohibited from being removed from the respective apertures. Furthermore, in a second orientation, the lock engages the aperture of the lock indicator in such a manner as to place the lock indicator in its first state wherein the light emitting diodes are illuminated. The operator may now remove the key from the lock to ensure that the device is maintained in a closed and locked configuration. Thus any unauthorized use of the vehicle is prohibited since neither the accelerator nor the brake pedal can be employed. Furthermore, any one gaining access to the interior of the vehicle would clearly see the blinking light emitting diodes or illuminated light emitting diodes indicating the securing device is present and operating.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A new and improved securing and indicating device for the accelerator and brake pedals of a vehicle, the securing and indicating device comprising, in combination:

a lower plate having an upper surface, a lower surface, a first end, a second end, a front edge and a rear edge, a first rectangular notch formed in the rear edge approximate the first end, a second rectangular notch formed within the rear edge approximate the second end, the rear edge extending at an angle between the first and second notches, a primary aperture formed within the lower plate approximate the first end, a secondary aperture formed within the lower plate intermediate the first and second notches approximate the rear edge;

a lock indicator having an upper surface, a lower surface, a forward edge and an angled rear edge, a number of light emitting diodes secured to the rear edge, an aperture formed within the upper surface of the lock indicator, the upper surface of the lock indicator secured to the lower surface of the lower plate intermediate the first and second rectangular notches such that the angled rear edge of the lock indicator matches the angle of the rear edge of the lower plate between the first and second rectangular notches, the lock indicator having a first state wherein the light emitting diodes are illuminated and a second state wherein the light emitting diodes are not illuminated;

an upper plate having an upper surface, a lower surface, a first end, a second end, a front edge, a rear edge, a first notch formed within the front edge proximate the first end, a second notch formed within the front edge approximate the second end, a portion of the front edge intermediate the first and second notches being angled, a primary aperture formed within the upper plate approximate the first end, a secondary aperture formed within the upper plate intermediate the first and second notches;

a pin secured to the primary aperture of the lower plate and the primary aperture of the upper plate such that the lower plate and upper plate can pivot relative to one another with the lower surface of the upper plate sliding upon the upper surface of the lower plate, the lower and upper plates together having a closed orientation wherein the first rectangular notch of the lower plate cooperates with the first notch of the upper plate to define a brake pedal retaining aperture and the second notch of the lower plate cooperates with the second notch of the upper plate to define an accelerator pedal retaining aperture; and a lock having a receiving end and a cylinder end, with the lower and upper plates in the closed orientation, the cylinder end adapted to be inserted in the secondary aperture of the lower plate and the secondary aperture of the upper plate and the aperture of the lock indicator, a latch having a first orientation permitting the lock to be removed from the apertures of the lower and upper plates, and a second orientation securing the lock within the apertures of the lower and upper plates and keeping the lower and upper plates in their closed orientation as well as placing the indicator in its first state.

2. A securing and indicating device for the accelerator and brake pedals of a vehicle, the securing and indicating device comprising, in combination:

a lower plate having an upper surface, a lower surface, a first end, a second end, a front edge and a rear edge, a first rectangular notch formed in the rear edge approximate the first end, a second rectangular notch formed within the rear edge approximate the second end, a primary aperture formed within the lower plate approximate the first end, a secondary aperture formed within the lower plate intermediate the first and second notches approximate the rear edge;

an upper plate having an upper surface, a lower surface, a first end, a second end, a front edge, a rear edge, a first notch formed within the front edge proximate the first end, a second notch formed within the front edge approximate the second end, a primary aperture formed within the upper plate approximate the first end, a secondary aperture formed within the upper plate intermediate the first and second notches;

a pin secured to the primary aperture of the lower plate and the primary aperture of the upper plate such that the lower plate and upper plate can pivot relative to one another with the lower surface of the upper plate sliding upon the upper surface of the lower plate, the lower and upper plates together having a closed orientation wherein the first rectangular notch of the lower plate cooperates with the first notch of the upper plate to define a brake pedal retaining aperture and the second notch of the lower plate cooperates with the second notch of the upper plate to define an accelerator pedal retaining aperture; and a lock having a receiving end and a cylinder end, with the lower and upper plates in the closed orientation, the cylinder end adapted to be inserted in the secondary aperture of the lower plate and the secondary aperture of the upper plate, a latch having a first orientation permitting the lock to be removed from the apertures of the lower and upper plates, and a second orientation securing the lock within the apertures of the lower and upper plates and keeping the lower and upper plates in their closed orientation; a lock indicator having an upper surface, a lower surface, a forward edge and a rear edge, a number of light emitting diodes secured to the rear edge, the upper surface of the lock indicator secured to the lower surface of the lower plate intermediate the first and second rectangular notches, the lock indicator having a first state wherein the light emitting diodes are illuminated and a second state wherein the light emitting diodes are not illuminated.

3. The securing and indicating device as described in claim 2 wherein the rear edge of the lower plate extends at an angle between the first and second notches and a portion of the front edge of the upper plate intermediate the first and second notches extends at an angle.

* * * * *